Figures 1, 2:
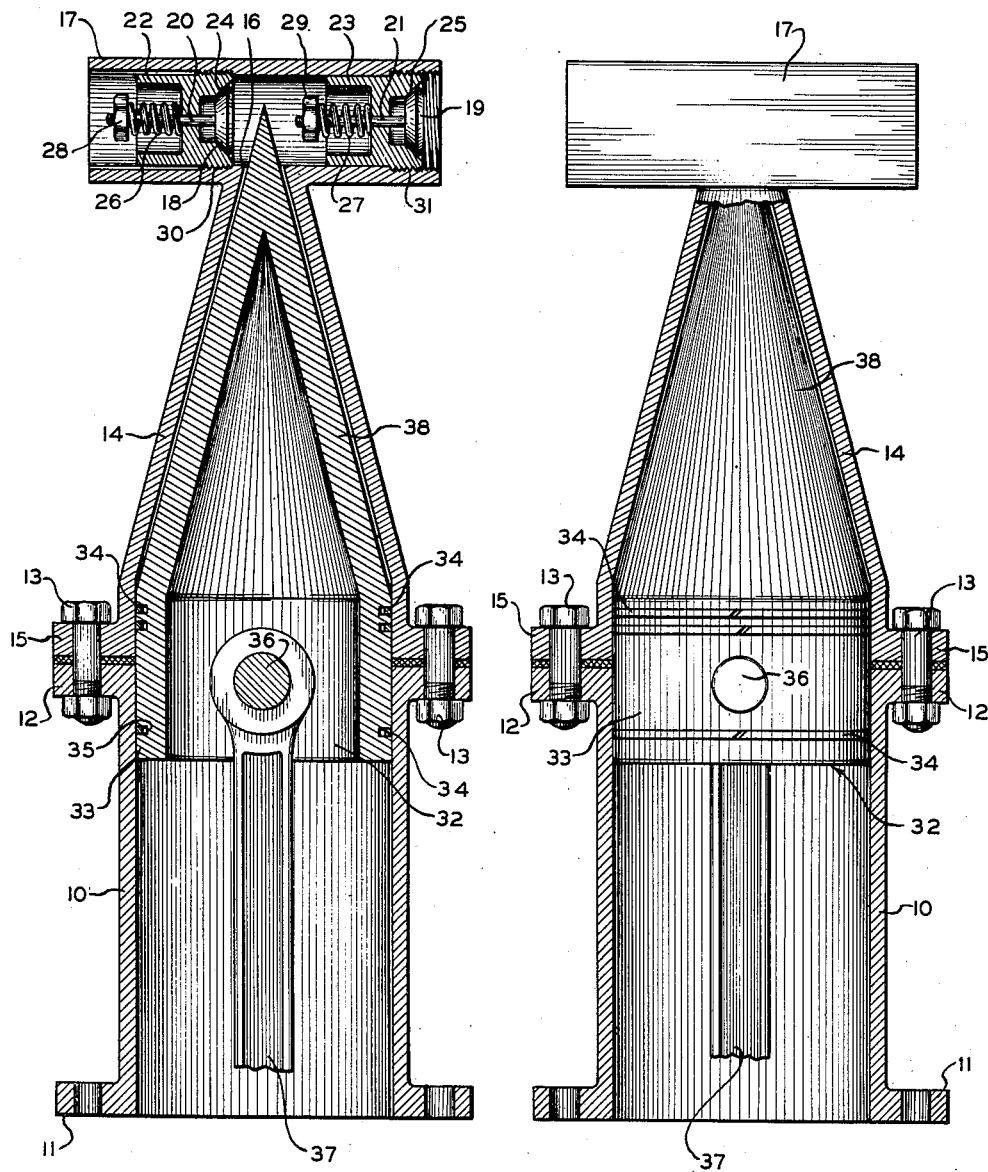

June 2, 1953 — H. T. CHAPPELLE — 2,640,432
EXPANSIBLE CHAMBER DEVICE
Filed Sept. 8, 1949

*INVENTOR.*
H. T. CHAPPELLE
BY
*Hyatt Dowell.*
ATTORNEY

Patented June 2, 1953

2,640,432

UNITED STATES PATENT OFFICE 2,640,432

EXPANSIBLE CHAMBER DEVICE

Homer T. Chappelle, Mineola, Tex.

Application September 8, 1949, Serial No. 114,507

1 Claim. (Cl. 103—153)

This invention relates to expansible chamber devices and more particularly to piston and cylinder construction susceptible of advantageous utilization in numerous devices for the movement of fluid with or without changes in volume, including air and volatile fluid compressors and suction producing devices, internal combustion engines and other structures in which the advantages of the present invention make possible very material improvements both in construction and operation.

Heretofore, many practical devices of this general character have been produced; however, in all of them the ultimate in construction and operation have not been attained and they have been susceptible to criticisms on account of their low efficiency, excessive development of heat, vibration, noise and rough operation.

Among the objects of the invention are to provide a device of this character in which shock and consequent vibration particularly that caused by the impingement of appreciable force on the flat head of a piston is reduced as well as the shock caused by the ingress and egress of fluid relative to the cylinder and in which heat dissipation is materially increased by the provision of a large area available for such dissipation.

Another object of the invention is to provide a device in which relatively high compression ratios are possible in order to materially improve economy and efficiency of operation with minimum energy input.

It is a further object of the invention to provide an expansible chamber device in which the heat dissipating area is materially greater than in the conventional piston and cylinder combination.

Further objects and advantages of the invention will be apparent from the following description taken in conjunction with the accompanying drawings, wherein:

Fig. 1 is a longitudinal sectional view illustrating a conical piston and cylinder with the piston at the upper end of its stroke; and Fig. 2 illustrates the piston and cylinder with the piston in elevation and the cylinder parts in section for greater clarity.

Briefly stated, the above objects are attained by providing an expansible chamber device in which a piston is provided with a sharp pointed conical surface and a cylindrical surface having sealing rings in contact with the walls of a cylinder. A portion of the cylinder is of conical formation complementary to the conical portion of the piston with the conical portion of the cylinder terminating in an orifice to permit the smooth flow of fluid during ingress and egress to the cylinder. The provision of a conical surface on the piston materially increases the area thereof in contact with the fluid in the cylinder, this area being considerably greater than the cross sectional area of the cylinder, thus resulting in a greater heat dissipating surface and a materially lower unit stress. Also, since the conical portion of the piston at the upper end of its stroke substantially fills the conical portion of the cylinder the volume of the unfilled space between the piston head and the cylinder head, when the piston is in its top center position, is reduced to a minimum, or it may be said that the clearance is reduced to a minimum. Such clearance may be made as small as manufacturing tolerances permit, it only being necessary to take into account normal wear of the parts in order to prevent actual metal to metal contact.

While the present invention may be applied equally well to many types of expansible chamber devices such as compressors, vacuum pumps and various forms of internal combustion engines, in order to simplify the description of the invention there has only been illustrated and described herein the basic piston and cylinder structure together with a very simple poppet valve mechanism. Obviously many variations of this basic structure will occur to those skilled in the art, such as various forms of heat dissipating means, many different types of valves and valve operating mechanisms as well as suitable auxiliary equipment which might be attached thereto in order to comply with special operating requirements.

With continued reference to the drawings, there is shown a cylinder 10 which may be secured to a crankcase or be cast or formed integrally therewith, depending upon the particular type of construction desired, or may be provided with a flange 11 to facilitate such attachment. Cylinder 10 may also be provided with a flange 12 for the reception of screw or other fastening means 13 for facilitating attachment of the cylinder to a generally conical portion 14, also provided with a flange 15 for the reception of the fastening means 13. Said conical portion 14 and cylinder 10 comprise wall structure of a compression chamber.

The conical portion 14 terminates in an orifice 16 and secured to the conical portion 14 in communication with the orifice 16 is a cylinder head 17. This cylinder head may likewise be attached in any conventional manner such as by welding, interengaging screw threads or may, if desired, be cast integrally therewith.

For simplicity of explanation, conventional poppet type valves are illustrated, the inlet valve 18 and discharge valve 19 being positioned in the transverse passage of cylinder head 17. These valves are provided with stems 20 and 21 slidably received in valve cages 22 and 23, valves 18 and 19 being normally retained against their seats 24 and 25 by coil springs or other equivalent means 26 and 27. Suitable spring retaining or adjusting means such as nuts 28 and 29 may be provided on the valve stems 20 and 21 in order to transmit the compressive force of the springs to the valve stems but this retaining means may be of any desired character, the nuts shown herein being for purposes of illustration only.

The valve cages 22 and 23 may be secured in place in the cylinder head 17 by the interengaging threaded portions 30 and 31 which permits the ready removal of the valves for servicing operations when such becomes necessary.

Slidably received within cylinder 10 is a piston 32 having a cylindrical skirt 33 of sufficient length to properly support and guide the piston within the cylinder and in this skirt there may be positioned a number of conventional sealing or piston rings 34 disposed in slots 35 and operating in a conventional and well known manner to seal the piston in the cylinder against the passage of fluid thereby in either direction. While for purposes of illustration three piston rings are shown in the drawing, nevertheless any desired number may be utilized and if necessary these may be of both the compression and oil ring type in order to adequately control the distribution of oil or other lubricating fluid and prevent passage of the same to the chamber above the piston.

In order to properly reciprocate the piston 32 in the cylinder 10 or to transmit power developed by the piston in the case of an internal combustion engine, there is provided a conventional wrist pin 36 pivotally engaging connecting rod 37 which may be attached by conventional bearing means to a crank shaft (not shown) in order to convert rotary motion to reciprocating motion or vice versa.

The upper portion of piston 32 is in the form of a sharp pointed cone 38 having a relatively steep angle, it having been found that an included angle of approximately 30° results in optimum operation although somewhat slight variation from this angle is possible such as approximately 10° in either direction. A cone having such an angle results in the area of the conical surface of the piston being appreciably greater than the cross sectional area of the cylinder which would be the area of the piston head in the case of a conventional flat top piston. The ratio of the area of the conical surface to the cross sectional area of the cylinder is approximately 5.76 for the 20° cone and 2.92 for the 40° cone. For the 30° the area thereof is approximately 3.86 times the cross sectional area of the cylinder. It will be seen that such a structure results in providing a very appreciable increased area from which the heat may be dissipated thus materially increasing the efficiency of the device and likewise the force exerted on the piston is distributed over a materially greater area than in the case of a flat top piston resulting in an appreciably lower unit stress.

As will be seen from an inspection of Fig. 1, the conical portion 38 of the piston 32 when at its upper limit of travel substantially fills the conical portion 14 of the cylinder 10, the clearance between the conical walls being determined only by manufacturing tolerances and whatever allowance is necessary for wear of the parts, in order to preclude any direct metal to metal contact. The point of the conical portion 38 projects through the orifice 16 into the cylinder head which eliminates any flat surface on the piston, thus preventing direct impingement of forces thereagainst. Since the conical portion 14 of the cylinder 10 is somewhat in the nature of a funnel, fluid flowing out of the cylinder is directed smoothly to the orifice 16 and expelled therefrom with a minimum of turbulence which in the case of an internal combustion engine would result in complete scavenging and preclude the necessity for complicated piston head and cylinder head contours.

Expansible chamber devices constructed in accordance with the invention and operated under widely varying conditions have proved exceedingly smooth and free from vibration and it has also been possible to attain relatively high pressures and volumes with comparatively low power input. Likewise, the application of the principle of this invention to internal combustion engines has resulted in the substantial elimination of detonation thereby permitting the use of a non premium relatively low cost fuel.

It will be obvious to those skilled in the art that various changes may be made in the invention without departing from the spirit and scope thereof and therefore the invention is not limited by that which is shown in the drawings and described in the specification but only as indicated in the appended claim.

What is claimed is:

An expansible chamber device for use with fluid comprising a cylinder having a cylindrical portion and a frusto-conical portion at one end with an opening through the small end of the frusto-conical portion, a cylinder head at the small end of the frusto-conical portion with a passage having its axis extending therethrough transversely of the axis of said cylinder and communicating with said cylinder through said opening, a piston having a cylindrical portion of complemental shape to the cylindrical portion of the cylinder and having a conical head portion of substantially complemental shape of the frusto-conical portion of the cylinder and free of any projections beyond the conical surface thereof, the area of the conical surface portion of the piston being approximately 3.86 times the cross sectional area of the cylindrical portion, said piston being mounted in said cylinder for reciprocating motion whereby when the piston reciprocates in the cylinder the apex of the conical head portion extends through said opening into said passage of said cylinder head at one extremity of movement for forcing fluid through said opening into said passage, inlet and exhaust valves positioned in the passage of said cylinder head on opposite sides of the opening in said frusto-conical portion for controlling ingress and egress of fluid into said cylinder, said valves being threadedly mounted therein with the axes of the valves coinciding with the axis of said transversely extending passage of said cylinder head and the apex of said piston at the end of the compression stroke adapted to project into said passage and intersect the valve's axis whereby the clearance is reduced to a minimum.

HOMER T. CHAPPELLE.

References Cited in the file of this patent

UNITED STATES PATENTS

| Number | Name | Date |
|---|---|---|
| 1,012,725 | Shadell | Dec. 26, 1911 |
| 1,534,728 | Noad | Apr. 21, 1925 |
| 1,602,371 | Browne | Oct. 5, 1926 |
| 2,098,106 | Pieck | Nov. 2, 1937 |

FOREIGN PATENTS

| Number | Country | Date |
|---|---|---|
| 27,057 | Great Britain | 1909 |
| 176,224 | Great Britain | Mar. 9, 1922 |
| 880,453 | France | Jan. 4, 1943 |